(12) United States Patent
Terdy

(10) Patent No.: US 12,735,090 B2
(45) Date of Patent: Sep. 15, 2026

(54) STEERING CONTROL SYSTEM

(71) Applicant: ZF Automotive UK Limited, Solihull (GB)

(72) Inventor: Tamas Terdy, Birmingham (GB)

(73) Assignee: ZF Automotive UK Limited, Solihull (GB)

( * ) Notice: Subject to any disclaimer, the term of this patent is extended or adjusted under 35 U.S.C. 154(b) by 0 days.

(21) Appl. No.: 18/669,705

(22) Filed: May 21, 2024

(65) Prior Publication Data

US 2024/0391519 A1 Nov. 28, 2024

(30) Foreign Application Priority Data

May 22, 2023 (GB) ..................................... 2307634

(51) Int. Cl.
*B62D 5/04* (2006.01)
*B62D 5/00* (2006.01)
*B62D 6/00* (2006.01)

(52) U.S. Cl.
CPC ............. *B62D 5/046* (2013.01); *B62D 5/001* (2013.01); *B62D 5/04* (2013.01); *B62D 5/0481* (2013.01); *B62D 6/00* (2013.01); *B62D 5/0496* (2013.01)

(58) Field of Classification Search
None
See application file for complete search history.

(56) References Cited

U.S. PATENT DOCUMENTS 9,434,404 B2 * 9/2016 Kuramochi .......... B62D 5/0487
9,522,695 B2 * 12/2016 Endo .................... B62D 5/0463
10,202,146 B2 * 2/2019 Endo .................... B62D 5/0463
12,116,063 B2 * 10/2024 Yamashita ............. B62D 6/002
2014/0032050 A1 1/2014 Kim
2015/0246683 A1 * 9/2015 Kuramochi ............ B62D 5/003 701/43
2016/0001811 A1 * 1/2016 Endo ........................ B62D 6/10 701/41
2022/0332368 A1 * 10/2022 Yamashita ............. B62D 6/002
2024/0391519 A1 * 11/2024 Terdy ....................... B62D 5/04

FOREIGN PATENT DOCUMENTS

CN 107891908 A * 4/2018 ............. B62D 6/002
CN 107891908 B * 7/2022 ............. B62D 5/001
CN 115219249 A * 10/2022 ............ G01M 17/06

(Continued)

*Primary Examiner* — Kevin R Steckbauer
(74) *Attorney, Agent, or Firm* — Kristin L. Murphy

(57) ABSTRACT

A steering control system for a vehicle comprising a steering input member controlled by a driver of the vehicle comprises a steering sensor for generating an electrical signal as a function of the position of the input member. The steering control system further comprises a steering actuator which operates on the steered wheels of the vehicle as a function of the electrical signal generated by the steering sensor. A steering controller receives the electrical signal generated by the steering sensor and provides a current to the steering actuator in order to operate on the steered wheels. An accumulation counter is operatively connected with the steering controller and is configured to calculate and record the accumulated workload of the steering controller by accumulating instantaneous workloads throughout operation thereof.

24 Claims, 4 Drawing Sheets

(56) References Cited

FOREIGN PATENT DOCUMENTS

| | | | | | |
|---|---|---|---|---|---|
| CN | 118991907 | A | * | 11/2024 | B62D 6/00 |
| CN | 115219249 | B | * | 3/2025 | G01M 17/06 |
| DE | 102008038890 | A1 | * | 2/2010 | B62D 5/0496 |
| DE | 102008038890 | A9 | * | 6/2010 | B62D 5/0481 |
| DE | 102015122253 | A1 | * | 6/2017 | B62D 5/0484 |
| DE | 102008038890 | B4 | * | 9/2021 | B62D 5/0481 |
| DE | 102021200428 | A1 | * | 7/2022 | G01M 17/06 |
| DE | 102024204182 | A1 | * | 11/2024 | B62D 6/00 |
| GB | 2630306 | A | * | 11/2024 | B62D 6/00 |
| JP | H0740756 | A | * | 2/1995 | |
| JP | 2001219867 | A | * | 8/2001 | |
| JP | 2021118582 | A | * | 8/2021 | |
| KR | 20140117166 | A | * | 10/2014 | B62D 5/0481 |

* cited by examiner

STEERING CONTROL SYSTEM

CROSS-REFERENCE TO RELATED APPLICATION

This application claims priority to GB Application No. 2307634.2, filed May 22, 2023, the disclosure of which is incorporated herein by reference in its entirety.

TECHNICAL FIELD

This disclosure relates generally to steering control systems, power steering units comprising such steering control systems, vehicle steering systems comprising such steering control systems and vehicles comprising such steering control systems. More specifically, although not exclusively, this disclosure relates to steering control systems for determining the accumulated workload of a steering controller.

BACKGROUND

During their lifetime, vehicle steering control systems are required to reliably operate for several thousands of hours. Generally, it is not known under what operational conditions they are subject to during their life, for example the number of hours of use, torque demand profile and/or ambient temperature.

It has been found that in the absence of this information an unknown factor is introduced into reliability calculations thereby making it difficult to predict the occurrence of faults. It will be appreciated that this uncertainty is made even greater due to the fact that there are several significantly different use cases that have very different operational demands over the lifetime of the vehicle, for example an average road user performs far fewer and shorter parking manoeuvres compared to a driving school car. Furthermore, ambient temperature can also have an impact on reliability and component degradation which, in turn, can result in differences in the reliability of steering control systems between cars operating in different climates.

SUMMARY

It has been found that one or more of the aforementioned issues may be overcome by utilising information from the steering controller in order to determine the workload of the steering control system over time.

In accordance with the present disclosure, there is provided a steering control system for a vehicle of the type comprising a steering input member controlled by a driver of the vehicle, a steering sensor for generating an electrical signal as a function of the position of the input member and/or a torque input applied through the input member and a steering actuator which operates on the steered wheels of the vehicle as a function of the electrical signal generated by the steering sensor, the steering control system comprising:

a steering controller which receives the electrical signal generated by the steering sensor and provides a current to, or controls a current provided to, the steering actuator in order to operate on the steered wheels; and an accumulation counter operatively connected with the steering controller and configured to calculate and record the accumulated workload of the steering controller or the steering control system by accumulating instantaneous workloads throughout operation thereof.

Advantageously, by determining an accumulated workload of a steering control system, the extent of use of individual systems when installed within vehicles can be quantified, thereby providing information to manufacturers and users. Furthermore, decisions can be made to adjust operational limits in order to extend the useful life of the steering control system or one or more components thereof. It will be appreciated that this may help to avoid component failure. Additionally, manufacturers of steering control systems may be provided with an improved understanding of the usage of systems when installed within vehicles, allowing for the development of predictive maintenance strategies and overall design improvement.

The steering sensor may comprise a steering input member position sensor or steering wheel position sensor, e.g. configured to determine the position of the steering input member. Additionally or alternatively, the steering sensor may comprise a torque sensor, e.g. configured to determine a torque input applied through the input member.

The steering control system may comprise a processor configured to process the electrical signal received from the steering sensor and determine the current to be provided to the steering actuator.

The position of the input member may be a rotational position of the input member, e.g. in relation to a straight ahead position. The input member may comprise a steering wheel.

The processor may be configured to provide an output to the steering controller representative of the current to be provided to the steering actuator.

The processor may be configured to determine a control signal to be provided to the steering actuator or to a motor drive inverter, motor speed controller or motor torque controller.

The steering controller may comprise the processor.

The steering control system may comprise or be operatively connected with a power supply or power unit. The power supply or power unit may be configured to provide a current to the steering actuator. The power supply or power unit may comprise one or more electrochemical cell(s).

The steering control system or steering controller may control the current provided to the steering actuator from the power supply or power unit, e.g. in dependence on the electrical signal received by the steering sensor.

The accumulation counter may comprise or may utilise a processor. The processor may be or may comprise the processor of the steering control system or steering controller. The processor may be configured to calculate the accumulated workload. The processor of the accumulation counter and the steering controller may be the same.

The accumulation counter may be or may comprise a microcontroller. The steering control system, controller and/or accumulation counter may comprise a memory. The accumulated workload may be stored in one or each memory.

The steering control system may comprise a motor drive inverter, motor speed controller or a motor torque controller (hereinafter referred to as a motor drive inverter). The steering control system or steering controller may provide a current to, or control a current provided to, the steering actuator via the motor drive inverter.

The motor drive inverter may be operatively connected with the power supply or power unit.

The steering controller may control the current provided to the steering actuator by providing a control signal to the motor drive inverter.

It will be understood that the term "workload" may be intended to refer to a characteristic property of an electrical output of the steering controller.

The steering controller may provide a signal to the accumulation counter or the processor indicative of the instantaneous workload of the steering control system or steering controller.

In an exemplary arrangement, an instantaneous workload of the steering controller is the instantaneous current provided to the steering actuator by the steering controller in order to operate on the steered wheels.

An instantaneous workload of the steering controller may be an instantaneous torque represented by the electrical signal received by the steering controller.

An instantaneous workload of the steering controller may be a weighted time unit. The weighted time unit may be determined by applying a weighting or factor or multiplier to an incremental time unit of operation, e.g. normal operation, of the steering controller, steering actuator, accumulation counter, motor drive inverter or steering control system. The applied weighting or factor or multiplier may be proportional to the instantaneous current provided to the steering actuator and/or the instantaneous torque represented by the electrical signal received by the steering controller. The weighting, factor or multiplier may be determined as described below. The weighting, factor or multiplier may instead be represented by a non-linear function or relationship with the current or torque represented by the electrical signal.

In an exemplary arrangement, the steering control system may comprise a weighting application or further weighting application to each instantaneous workload in dependence on an operational condition of the steering control system to provide a weighted workload unit.

The weighting application may be or may comprise the accumulation counter.

In an exemplary arrangement, the accumulation counter is configured to determine an accumulation of weighted workload units. The accumulation counter may be configured to determine an accumulation of weighted workload units to provide an overall workload of the steering controller.

The operational condition may include a torque represented by the electrical signal received by the steering controller, e.g. from the steering sensor.

In an exemplary arrangement, the steering control system or steering controller is configured to determine a torque, e.g. a demanded torque, represented by the electrical signal received from the steering sensor. The current provided to the steering actuator may be dependent on a torque represented by the electrical signal generated by the steering sensor. The torque may be the required output torque of the steering actuator to operate on the steered wheels, e.g. based on the electrical signal received from the steering sensor.

The applied weighting may be proportional to the torque represented by the electrical signal. The applied weighting and torque represented by the electrical signal may be directly proportional. The applied weighting may be increased as the torque represented by the electrical signal is increased. In an exemplary arrangement, the greater the torque represented by the electrical signal the greater the applied weighting. The weighting may instead be represented by a non-linear function or relationship with the torque represented by the electrical signal.

The operational condition may include the current provided to the steering actuator by the steering controller.

The applied weighting may be proportional to the current. The applied weighting and current may be directly proportional. The applied weighting may be increased as the current is increased. In an exemplary arrangement, the greater the torque represented by the current the greater the applied weighting. The weighting may instead be represented by a non-linear function or relationship with the current.

The operational condition may include an operational temperature of the steering controller, steering actuator, accumulation counter, motor drive inverter and/or steering control system.

The applied weighting may be proportional to the operational temperature of the steering controller, steering actuator, accumulation counter, motor drive inverter and/or steering control system. The applied weighting and operational temperature of the steering controller, steering actuator, accumulation counter, motor drive inverter and/or steering control system may be directly proportional. The applied weighting may be increased as the operational temperature of the steering controller, steering actuator, accumulation counter, motor drive inverter and/or steering control system is increased. In an embodiment, the greater the operational temperature of the steering controller, steering actuator, accumulation counter, motor drive inverter and/or steering control system the greater the applied weighting. The weighting may instead be represented by a non-linear function or relationship with the operational temperature of the steering controller, steering actuator, accumulation counter, motor drive inverter and/or steering control system.

The operational temperature of the steering controller, steering actuator, accumulation counter, motor drive inverter or steering control system may be an ambient air temperature around the steering controller, steering actuator, accumulation counter, motor drive inverter and/or steering control system or a component or part thereof.

The operational temperature of the steering controller, steering actuator, accumulation counter, motor drive inverter or steering control system may be an internal temperature of or within the steering controller, steering actuator, accumulation counter, motor drive inverter and/or steering control system or a component or part thereof.

The operational temperature of the steering controller, steering actuator, accumulation counter, motor drive inverter or steering control system may be a temperature, e.g. an internal temperature, of a component or part thereof.

The operational condition may comprise a plurality of operational conditions, for example two or more of a torque represented by the electrical signal received by the steering controller, the current provided to the steering actuator by the steering controller and/or operational temperature of the steering controller, steering actuator, accumulation counter, motor drive inverter and/or steering control system.

In the case of a plurality of operational conditions, each operational condition may comprise a weighting as described above. The weightings may be multiplied to provide an overall weighting.

In an exemplary arrangement, the steering control system comprises an overall workload threshold. The overall workload threshold may be or may comprise a cumulative workload threshold.

The steering control system may comprise an alert function. The alert function may be configured to be activated when the overall workload or accumulated workload determined by the accumulation counter exceeds the overall workload threshold.

The alert function may comprise an alarm function or a warning function. The alert function or warning function may comprise an audible or visible alarm or indication.

In an exemplary arrangement, the steering control system is configured to apply an operational limit or an operational restriction to the steering controller when the accumulation counter determines that the overall workload or accumulated workload is within a predetermined range of the overall workload threshold or exceeds the overall workload threshold.

The operational limit or operational restriction may be a maximum current that can be provided to the steering actuator. The operational limit or operational restriction may be a reduction in the maximum current that can be provided to the steering actuator.

In the case of a power steering system, or where the steering actuator is a power steering actuator or power steering motor, the operational limit or operational restriction may be reduction or limit in the assistive torque, e.g. operating on the steered wheels.

In an exemplary arrangement, the steering control system is configured to apply an operational limit or an operational restriction to the steering control system or steering controller when the operational temperature of the steering controller, power unit, steering actuator, accumulation counter and/or motor drive inverter exceeds a predetermined temperature threshold.

The steering control system may comprise a temperature sensor. The operational temperature may be measured or determined by the temperature sensor.

In an exemplary arrangement, the steering control system or steering controller is configured to reduce the predetermined temperature threshold when the accumulated workload is within a predetermined range of the overall workload threshold or exceeds the overall workload threshold.

The operational limit or operational restriction may be determined from a look-up table.

In an exemplary arrangement, the steering control system is configured to monitor the temperature of the steering controller, power unit, steering actuator, accumulation counter and/or motor drive inverter. The steering control system or steering controller may be configured to reduce the current provided to the steering actuator when the accumulation counter determines that the overall workload or accumulated workload is within a predetermined range of the overall workload threshold, exceeds the overall workload threshold and/or the temperature of the steering control system, steering controller, power unit, steering actuator, accumulation counter and/or motor drive inverter is above or exceeds a predetermined temperature threshold.

The steering control system may be configured to adjust an operational envelope of the steering controller, power unit, steering actuator, accumulation counter and/or motor drive inverter e.g. when the accumulation counter determines the overall workload or accumulated workload is within a predetermined range of the overall workload threshold, exceeds the overall workload threshold and/or the temperature of the of the steering controller, power unit, steering actuator, accumulation counter and/or motor drive inverter is above or exceeds a predetermined temperature threshold.

The operational limit or operational restriction may be a maximum period of time at which current above a predetermined threshold can be provided to the steering actuator.

In an exemplary arrangement, the weighting is determined from a lookup table. The weighting and/or lookup table may be stored in a memory of the steering control system.

The weighting may be applied as a multiplier to each instantaneous workload.

In an exemplary arrangement, the accumulation counter is configured to determine an accumulated workload of the steering controller by integrating the instantaneous workloads over time.

The accumulation counter may be configured to determine the accumulated workload throughout the life of the steering control system, steering controller, power unit, steering actuator, accumulation counter, motor drive inverter and/or another component or part thereof.

In an exemplary arrangement, the steering actuator comprises a power steering actuator or a power steering motor. The steering actuator may comprise an electric motor, for example a brushless electric motor. The power steering actuator or power steering motor may comprise an electric motor, for example a brushless electric motor.

The steering control system described above may be for use in a steer-by-wire vehicle and the steering actuator may set the position of the steered wheels.

The steering control system described above may be for use in a power steering vehicle, a power steering system or a power steering unit.

The steering control system, steering controller and/or accumulation counter may comprise an communication interface, e.g. for communication with an external device. The external device may be a device external of the steering control system, or vehicle within which the steering control system is installed. The communication interface may comprise a port or socket for receipt of a data transfer device, e.g. a cable. The communication interface may comprise a transmitter, receiver and/or transceiver. The communication interface may be configured to transfer, download or provide information or data in relation to the accumulated workload of the steering control system, power unit, steering actuator, accumulation counter, motor drive inverter and/or another component of the steering control system.

Another aspect of the disclosure provides a power steering unit comprising a steering control system as described above.

Another aspect of the disclosure provides a steer-by-wire steering unit or system comprising a steering control system as described above.

Another aspect of the disclosure provides a vehicle steering system comprising a steering control system as described above. The vehicle steering system may be a power steering system or a steer-by-wire steering system.

Another aspect of the disclosure provides a vehicle comprising a steering control system, a power steering unit, a steer-by-wire steering unit or system or a vehicle steering system as described above.

For the avoidance of doubt, any of the features described herein apply equally to any aspect of the disclosure.

For purposes of this disclosure, and notwithstanding the above, it is to be understood that any controller(s), control units and/or control modules described herein may each comprise a control unit or computational device having one or more electronic processors. The controller may comprise a single control unit or electronic controller or alternatively different functions of the control of the system or apparatus may be embodied in, or hosted in, different control units or controllers or control modules. As used herein, the terms "control unit" and "controller" will be understood to include both a single control unit or controller and a plurality of control units or controllers collectively operating to provide the required control functionality. A set of instructions could be provided which, when executed, cause said controller(s) or control unit(s) or control module(s) to implement the control techniques described herein. The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described herein may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, arrangements, examples and alternatives set out in the preceding paragraphs, in the claims and/or in the following description and drawings, and in particular the individual features thereof, may be taken independently or in any combination. That is, all arrangements and/or features of any arrangement can be combined in any way and/or combination, unless such features are incompatible. For the avoidance of doubt, the terms “may”, “and/or”, “e.g.”, “for example” and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Exemplary arrangements of the disclosure will now be described by way of example only with reference to the accompanying drawings in which.

DETAILED DESCRIPTION

Figure 1:
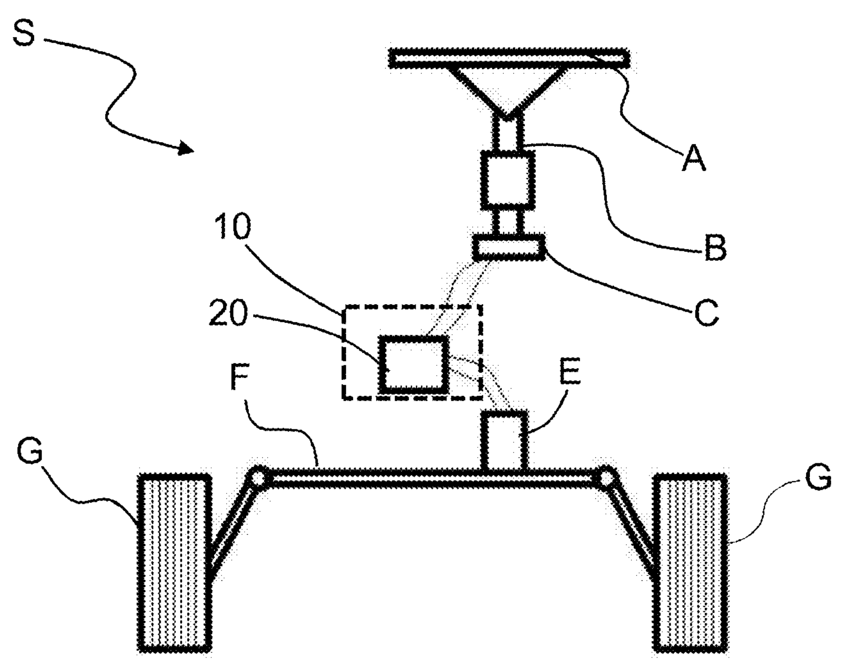
FIG. 1 is a schematic illustration of a steer-by-wire vehicle steering system in accordance with the present disclosure.

FIG. 1 illustrates a vehicle steering system S for a vehicle incorporating a steering control system 10 in accordance with the present disclosure. The vehicle steering system S includes a steering input member, in the form of a steering wheel A, to allow a driver of the vehicle to provide an input steering command. The steering wheel A is connected to an end of an elongate steering shaft B.

A steering input applied through the steering wheel A is measured by a steering sensor forming part of the steering column assembly, shown schematically at C in FIG. 1. An electrical signal representative of the steering input (i.e. the rotation of the steering wheel A and steering shaft B) is transmitted from the steering sensor C to a steering controller 20, which forms part of the steering control system 10. The steering controller 20 controls a current provided to a steering actuator E, which is an electric motor in this example, in dependence on the electrical signal received from the steering sensor C. The steering actuator E applies the steering input to the steering axle F, and therefore steers the steered wheels G as a function of the rotational position of the steering wheel A.

As will be described in greater detail below in respect of FIGS. 2 and 3, the steering control system 10 is configured to calculate and record the accumulated workload of the steering controller 20, or one or more other components of the vehicle steering system S, by accumulating instantaneous workloads throughout the operation thereof.

Figure 4:
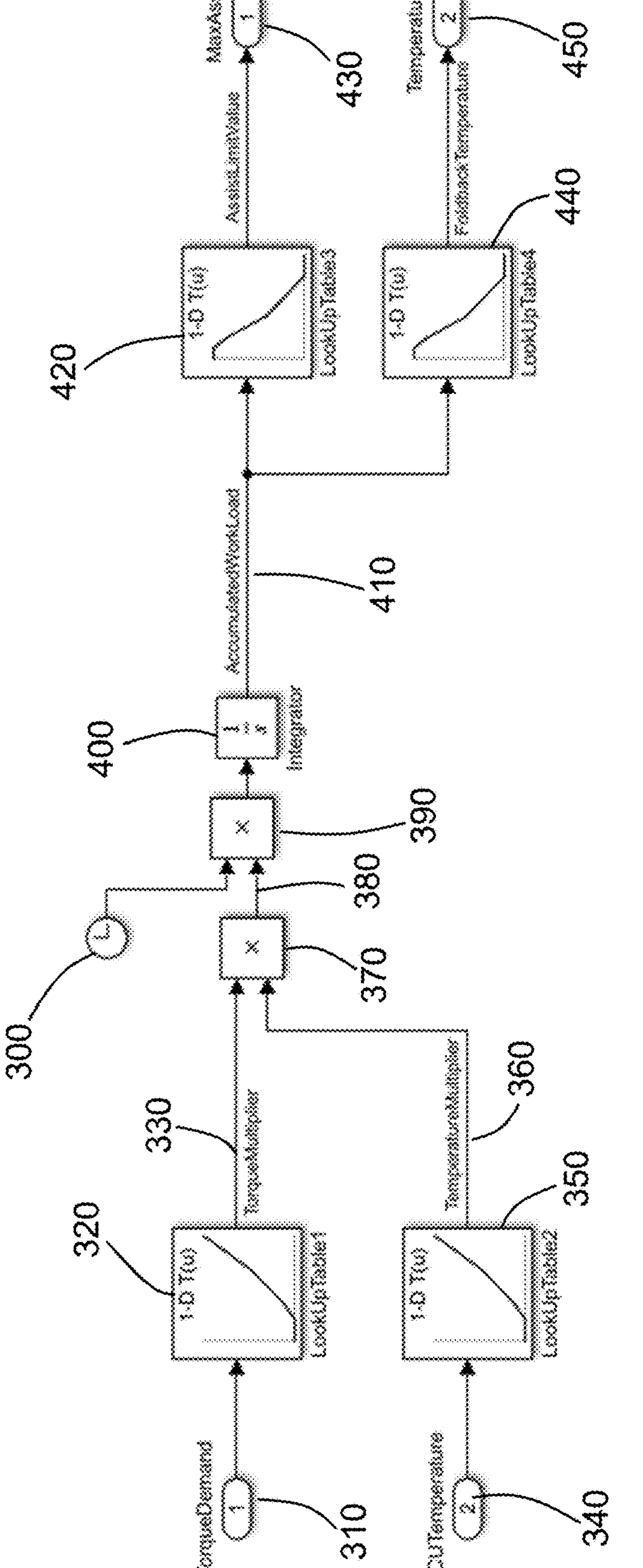
FIG. 4 is another signal flow diagram showing the calculation of overall workload of a steering controller in accordance with the present disclosure.

It will be appreciated that the steering control system 10 is shown in FIG. 1 incorporated into a steer-by-wire vehicle steering system S. However, it will be appreciated that the steering control system 10 may instead be incorporated into a power steering vehicle steering system S', as shown in FIG. 4, with minor modification.

Figure 2:
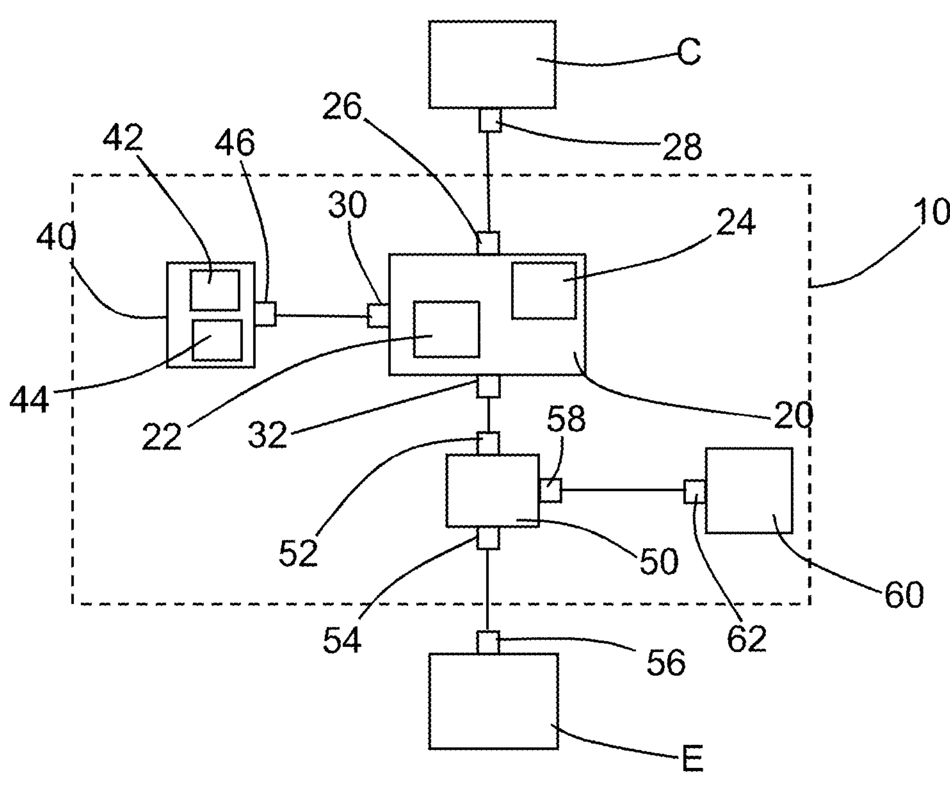
FIG. 2 is a schematic illustration of a steering control system in accordance with the present disclosure.

FIG. 2 illustrates a steering control system 10 as incorporated into the vehicle steering system S of FIG. 1. The steering control system 10 includes a steering controller 20 having a processor 22 and a memory 24. The steering controller 20 has an input 26 operatively connected with an output 28 of the steering sensor C and is configured to receive an electrical signal therefrom. The connection between the steering controller 20 and the steering sensor C is shown as a physical connection, e.g. wired connection, in this example, but it will be appreciated that the connection may instead be wireless. For example, the output 28 of the steering sensor C may be a transmitter and the input 26 of the steering controller 20 may be a receiver.

It will be appreciated that in arrangements the steering controller 20 may not have a processor 22. Instead the processor 22 may be a separate component and operatively connected with the steering controller 20.

The steering control system 10 also includes an accumulation counter 40 having a processor 42 and a memory 44. The accumulation counter 40 has an input 46 operatively connected with an output 30 of the steering controller 20. The connection between the steering controller 20 and the accumulation counter 40 is shown as a physical connection, e.g. wired connection, in this example, but it will be appreciated that the connection may instead be wireless. For example, the output 30 of the steering controller 20 may be a transmitter and the input 46 of the accumulation counter 40 may be a receiver. It will be appreciated that the accumulation counter 40 may not be provided as a standalone hardware element, but may instead be incorporated into the steering controller 20 such that the processor 42 is provided by the processor 22 and/or the memory 44 is provided by memory 24.

The accumulation counter 40 is configured to calculate and record the accumulated workload of the steering controller 20 by accumulating instantaneous workloads throughout the operation thereof. The accumulation counter 40 is configured to store the accumulated workload in the memory 44.

In the present example, the steering control system 10 further includes a motor drive inverter 50 having an input 52 operatively connected with a further output 32 of the steering controller 20. An output 54 of the motor drive inverter 50 is operatively connected with an input 56 of the steering actuator E. It will be appreciated that the motor drive inverter 50 may not form part of the steering control system 10, but instead may form part of the steering actuator E or may be a standalone component. The motor drive inverter 50 is configured to adjust the frequency of a supply current from a power supply 60 in order to control the speed of the electric motor of the steering actuator E.

The connection between the steering controller 20 and the motor drive inverter 50 is shown as a physical connection, e.g. wired connection, in this example, but it will be appreciated that the connection may instead be wireless. For example, the further output 32 of the steering controller 20 may be a transmitter and the input 52 of the motor drive inverter 50 may be a receiver.

The power supply 60 is configured to provide a current to the steering actuator E via the motor drive inverter 50. The power supply 60 is an electrochemical cell in this example and has an output 62 that is operatively connected with a further input 58 of the motor drive inverter 50. The connection between the power supply 60 and the motor drive inverter 50 is a physical connection, e.g. wired connection. It will be appreciated that the power supply 60 may not form part of the steering control system 10, but instead may form part of the steering actuator E or may be a standalone or separate component.

In use, a driver of a vehicle provides a steering input through the steering wheel A (FIG. 1). The steering sensor C generates an electrical signal that is representative of, or is a function of, the rotational position of the steering wheel A. The electrical signal is transmitted from the output 28 of the steering sensor C and is received at the input 26 of the steering controller 20.

The processor 22 of the steering controller 20 processes the electrical signal received from the steering sensor C to determine the current to be provided to the steering actuator E in order to operate on the steered wheels G (FIG. 1) based on the driver input. Based on the determination by the processor 22, the steering controller 20 is configured to provide a control signal at the output 32 to be sent to the motor drive inverter 50. The processor 22 may determine the required current from a look-up table stored in the memory 24.

The motor drive inverter 50 receives the control signal at its input 52, and carries out the necessary changes to the frequency of the current received from the power supply 60. Instead, the motor drive inverter 50 may receive the control signal at its input 52, and draw the necessary current from the power supply 60.

Once the processor 22 has determined the current to be provided to the steering actuator E the accumulation counter 40 calculates and records the accumulated workload of the steering controller 20. The accumulation counter 40 may determine the instantaneous workload concurrently with the steering controller 20 determining the current.

It will be understood that the term "workload" is intended to refer to a characteristic property of an electrical output of the steering controller.

In this example, the steering controller 20 sends a signal to the input 46 of the accumulation counter 40, and the processor 42 determines an instantaneous workload of the steering control system 10 or the steering controller 20. The instantaneous workload is the instantaneous current provided to the steering actuator E and is stored in the memory 44. The accumulation counter 40 determines the accumulated workload of the steering control system 10 or the steering controller 20 by accumulating the instantaneous workloads throughout operation thereof and stores the accumulated workload in the memory 44.

In the present example, the accumulation counter 40, which as described above may form part of the steering controller 20, is arranged to apply a weighting to each instantaneous workload in dependence on an operational condition of the steering control system 10 to determine a weighted workload unit. The weighting is applied as a multiplier to each instantaneous workload, and is stored in the memory 44 in the form of a look-up table.

In the present example, the operational condition is a torque represented by the electrical signal received by the steering controller 20 from the steering sensor C. In such a case, in addition to the determination of required current as described above, the processor 22 of the steering controller 20 processes the electrical signal received from the steering sensor C to determine the torque. The torque is the required output torque of the steering actuator E to operate on the steered wheels G (FIG. 1) based on the driver input. The steering controller 20 sends a signal to the input 46 of the accumulation counter 40 indicative of the torque, and the processor 42 determines the required weighting from the look-up table stored in the memory 44. The weighting is proportional to the torque represented by the electrical signal.

The accumulation counter 40 is configured to determine an accumulation of weighted workload units to provide an overall workload of the steering controller system 10 or steering controller 20.

An alert function may be provided, or an operational limit or operational restriction may be imposed on the steering control system 10 when it is determined that the overall workload exceeds or is within a predetermined range of a predetermined threshold.

Figure 3:
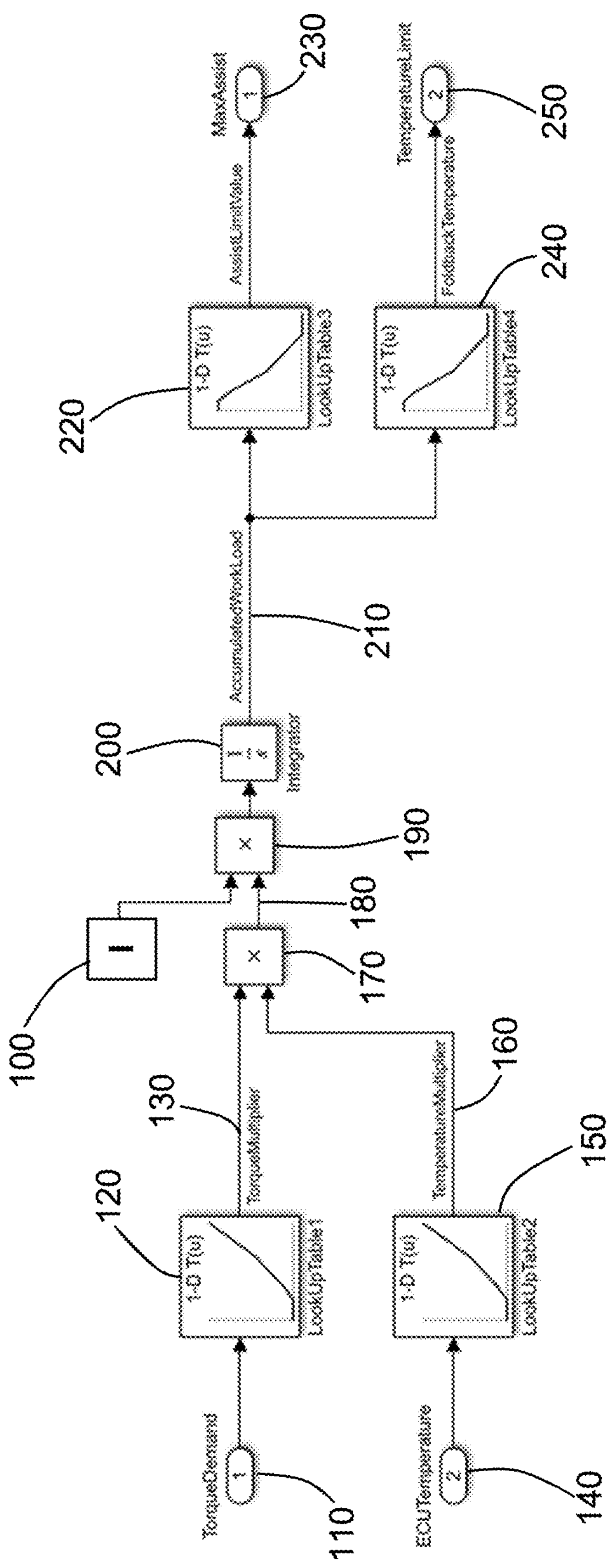
FIG. 3 is a signal flow diagram showing the calculation of overall workload of a steering controller in accordance with the present disclosure.

FIG. 3 illustrates a signal flow diagram outlining the determination of accumulated workload by the processor 42 of the accumulation counter 40 and the resulting application of operational limits or operational restrictions to the steering control system 10 (FIG. 1). The steering control system 10 according to this example forms part of a power steering unit.

At step 100, the current "I" provided, or to be provided, to the steering actuator E (FIG. 2) is received from the steering controller 20 (FIG. 2). In the present example, the current is an instantaneous current, and defines the instantaneous workload of the steering control system 10 or steering controller 20.

Furthermore, at step 110, a first operational condition, in the form of demanded torque, is determined based on the electrical signal received by the steering controller 20 from the steering sensor C (FIG. 2). The torque is the required output torque of the steering actuator E to operate on the steered wheels G (FIG. 1) based on the driver input. At step 120 a look-up table, stored in the memory 44 (FIG. 2) of the accumulation counter 40, is used to determine a required weighting 130 to be applied to the workload based on the torque. The weighting 130 is proportional to the torque represented by the electrical signal.

In the present example, at step 140 a second operational condition, in the form of an operational temperature of the steering controller 20, is measured using a temperature sensor. The second operational condition is determined concurrently with the first operational condition. At step 150 a look-up table, also stored in the memory 44 of the accumulation counter 40, is used to determine a required weighting 160 to be applied to the workload based on the torque. The weighting 160 is proportional to the temperature of the steering controller 20.

At step 170, the weightings 130, 160 are multiplied together to provide an overall weighting at step 180.

At step 190 the instantaneous workload provided at step 100 and the overall weighting provided at step 180 are multiplied together to provide a weighted workload unit. Each weighted workload unit is stored in the memory 44, and at step 200 the stored weighted workload units are integrated to determine an accumulation of weighted workload units and provide an overall workload of the steering control system or steering controller at step 210.

The overall workload is then compared with an overall workload threshold. If the overall workload is determined to be within a predetermined range of the overall workload threshold or exceeds the overall workload threshold then an operational limit or operational restriction is applied to the steering control system 10 or steering controller 20.

In the present example, two different operational limits are applied to the steering control system 10. The first operational limit is a maximum limit to the assistive torque provided to the steered wheels G in response to a rotational position of the steering wheel A (FIG. 1). At step 220, a look-up table is used to determine the operational limit to assistive torque in dependence on the comparison between the overall workload and the overall workload threshold. In this example, the operational limit is reduced as the overall workload is increased in order to improve the longevity of the steering control system 10 and/or one of more components thereof. The limit to the assistive torque is output at step 230.

The second operational limit is in relation to the operational temperature of the steering control system 10 or one or more components thereof. In particular, the second operational limit is a temperature limit or threshold beyond which an output from the steering control system 10 is reduced. At step 240, a look-up table is used to determine the temperature threshold in dependence on the comparison between the overall workload and the overall workload threshold.

In this example, the temperature threshold is reduced as the overall workload is increased in order to improve the longevity of the steering control system 10 and/or one of more components thereof. The temperature threshold is output at step 250. If a measured operational temperature of the steering control system 10 or one or more components thereof exceeds the temperature threshold, the current provided to the steering actuator may be reduced.

FIG. 4 illustrates another signal flow diagram outlining the determination of accumulated workload by the processor 42 of the accumulation counter 40 and the resulting application of operational limits or operational restrictions to the steering control system 10 (FIG. 1). The steering control system 10 according to this example forms part of a power steering unit.

At step 300, the on-time of the steering controller 20 (FIG. 2) is determined and provided as an incremental time unit of operation.

Furthermore, at step 310, a first operational condition, in the form of demanded torque, is determined based on the electrical signal received by the steering controller 20 from the steering sensor C (FIG. 2). The torque is the required output torque of the steering actuator E to operate on the steered wheels G (FIG. 1) based on the driver input. At step 320 a look-up table, stored in the memory 44 (FIG. 2) of the accumulation counter 40, is used to determine a required weighting 330 to be applied to the incremental time unit of operation based on the torque. The weighting 330 is proportional to the torque represented by the electrical signal.

In the present example, at step 340 a second operational condition, in the form of an operational temperature of the steering controller 20, is measured using a temperature sensor. The second operational condition is determined concurrently with the first operational condition. At step 350 a look-up table, also stored in the memory 44 of the accumulation counter 40, is used to determine a required weighting 360 to be applied to the incremental time unit of operation based on the torque. The weighting 360 is proportional to the temperature of the steering controller 20.

At step 370, the weightings 330, 360 are multiplied together to provide an overall weighting at step 380.

At step 390 the incremental time unit of operation provided at step 300 and the overall weighting provided at step 380 are multiplied together to provide a weighted workload unit. Each weighted workload unit is stored in the memory 44, and at step 400 the stored weighted workload units are integrated to determine an accumulation of weighted workload units and provide an overall workload of the steering control system or steering controller at step 410.

The overall workload is then compared with an overall workload threshold. If the overall workload is determined to be within a predetermined range of the overall workload threshold or exceeds the overall workload threshold then an operational limit or operational restriction is applied to the steering control system 10 or steering controller 20.

In the present example, two different operational limits are applied to the steering control system 10. The first operational limit is a maximum limit to the assistive torque provided to the steered wheels G in response to a rotational position of the steering wheel A (FIG. 1). At step 420, a look-up table is used to determine the operational limit to assistive torque in dependence on the comparison between the overall workload and the overall workload threshold. In this example, the operational limit is reduced as the overall workload is increased in order to improve the longevity of the steering control system 10 and/or one of more components thereof. The limit to the assistive torque is output at step 430.

The second operational limit is in relation to the operational temperature of the steering control system 10 or one or more components thereof. For example, the second operational limit is a temperature limit or threshold beyond which an output from the steering control system 10 is reduced. At step 440, a look-up table is used to determine the temperature threshold in dependence on the comparison between the overall workload and the overall workload threshold.

In this example, the temperature threshold is reduced as the overall workload is increased in order to improve the longevity of the steering control system 10 and/or one of more components thereof. The temperature threshold is output at step 450. If a measured operational temperature of the steering control system 10 or one or more components thereof exceeds the temperature threshold, the current provided to the steering actuator may be reduced.

Figure 5:
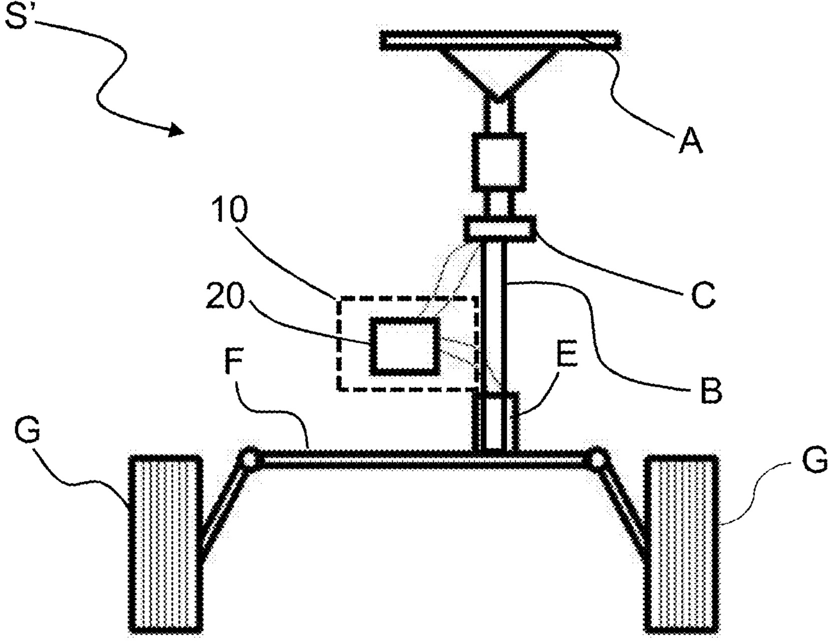
FIG. 5 is a schematic illustration of a power steering vehicle steering system in accordance with the present disclosure.

FIG. 5 illustrates a vehicle steering system S' for a vehicle incorporating a steering control system 10 in accordance with the present disclosure. The vehicle steering system S' is similar to the vehicle steering system S described above in respect of FIG. 1 and includes a steering input member, in the form of a steering wheel A, to allow a driver of the vehicle to provide an input steering command. The steering wheel A is connected to an end of an elongate steering shaft B that provides a direct connection between the steering wheel A and the steering axle F.

A steering input applied through the steering wheel A is measured by a steering sensor forming part of the steering column assembly, shown schematically at C in FIG. 4. The steering input applied through the steering wheel A acts directly on the steering axle F and results in steering of the wheels G.

An electrical signal representative of the steering input (i.e. the rotation of the steering wheel A and steering shaft B) is transmitted from the steering sensor C to a steering controller 20, which forms part of the steering control system 10. The steering controller 20 controls a current provided to a steering actuator E, which is an electric power steering motor in this example, in dependence on the electrical signal received from the steering sensor C. The steering actuator E provides an assistive steering input to the steering axle F in addition to the rotation of the steering shaft B, and therefore helps to steer the steered wheels G as a function of the rotational position of the steering wheel A.

As is described above in respect of FIGS. 2 and 3, the steering control system 10 is configured to calculate and record the accumulated workload of the steering controller 20, or one or more other components of the vehicle steering system S', by accumulating instantaneous workloads throughout the operation thereof.

It will be appreciated by those skilled in the art that several variations to the aforementioned exemplary arrangements are envisaged without departing from the scope of the disclosure.

It will also be appreciated by those skilled in the art that any number of combinations of the aforementioned features and/or those shown in the appended drawings provide clear advantages over the prior art and are therefore within the scope of the disclosure described herein.

The invention claimed is:

1. A steering control system for a vehicle, comprising:

a steering input member;

a steering sensor configured to generate an electrical signal as a function of a position of the steering input member;

a steering actuator configured to operate on steered wheels of the vehicle as a function of the electrical signal;

a steering controller configured to receive the electrical signal and provide current to the steering actuator; and an accumulation counter comprising at least one electronic processor and a non-transitory memory storing executable instructions which, when executed by the processor, cause the accumulation counter to: (i) determine an instantaneous workload value for the steering controller; (ii) obtain a torque value represented by the electrical signal and an operational temperature of the steering controller; (iii) determine a torque weighting factor from a first lookup table indexed by the torque value and a temperature weighting factor from a second lookup table indexed by the operational temperature; (iv) form a weighted workload unit by multiplying the instantaneous workload value by the torque weighting factor and the temperature weighting factor; and (v) integrate the weighted workload unit over time to calculate and record an overall accumulated workload of the steering controller.

2. A steering control system according to claim 1, wherein the instantaneous workload value of the steering controller is an instantaneous current provided to the steering actuator by the steering controller in order to operate on the steered wheels.

3. A steering control system according to claim 1, wherein the instantaneous workload value is determined for each incremental time unit, and the weighted workload unit is determined by applying a multiplier equal to the product of the torque weighting factor and the temperature weighting factor to the incremental time unit.

4. A steering control system according to claim 1, comprising a weighting circuit or processor configured to apply the torque weighting factor and the temperature weighting factor to each instantaneous workload value to provide the weighted workload unit.

5. A steering control system according to claim 4, wherein the accumulation counter is configured to determine an accumulation of weighted workload units to provide an overall workload of the steering controller.

6. A steering control system according to claim 4, wherein the torque value used to index the first lookup table is a demanded torque represented by the electrical signal received by the steering controller.

7. A steering control system according to claim 6, wherein the the weighting factor is proportional to the torque represented by the electrical signal.

8. A steering control system according to claim 4, wherein the weighting circuit or processor is configured to receive as an input an operational condition comprising the current provided to the steering actuator by the steering controller, and the accumulation counter is further configured to determine a current weighting factor from a third lookup table indexed by the current.

9. A steering control system according to claim 8, wherein the third lookup table is monotonic such that the current weighting factor increases with increasing current.

10. A steering control system according to claim 4, wherein the operational temperature is an internal temperature of the steering controller measured by a temperature sensor or estimated by the steering controller.

11. A steering control system according to claim 10, wherein the second lookup table is montonic such that the temperature weighting factor increases with operational temperature.

12. A steering control system according to claim 4, comprising an overall workload threshold.

13. A steering control system according to claim 12, comprising an alert circuit or controller configured to activate an alert when the overall workload determined by the accumulation counter exceeds the overall workload threshold.

14. A steering control system according to claim 12, further comprising a control processor configured to apply an operational limit to the steering controller when the accumulation counter determines that the overall workload is within a predetermined range of the overall workload threshold.

15. A steering control system according to claim 12, further comprising a temperature monitoring module configured to monitor the temperature of the steering controller and reduce the current provided to the steering actuator when the accumulation counter determines that the overall workload is within a predetermined range of the overall workload threshold and the temperature is above a predetermined threshold.

16. A steering control system according to claim 13, further comprising a control processor, wherein the control processor is configured to enforce an operational limit comprising a maximum current provided to the steering actuator and/or a maximum period of time during which current above a predetermined threshold is provided to the steering actuator.

17. A steering control system according to claim 4, wherein at least one of the first and second lookup tables is stored in the non-transitory memory of the accumulation counter.

18. A steering control system according to claim 4, wherein the weighting circuit or controller applies the weighting factor as a multiplier to each instantaneous workload.

19. A steering control system according to claim 1, wherein the accumulation counter is configured to determine the accumulated workload throughout the life of the steering controller.

20. A steering control system according to claim 1, wherein the steering actuator comprises a power steering motor.

21. A steering control system according to claim 1, for use in a steer-by-wire vehicle and wherein the steering actuator is configured to set the position of the steered wheels.

22. A power steering unit comprising a steering control system according to claim 1.

23. A vehicle steering system comprising a steering control system according to claim 1.

24. A vehicle comprising a steering control system according to claim 1.

* * * * *